United States Patent
Dorofeev et al.

(10) Patent No.: US 10,337,077 B2
(45) Date of Patent: Jul. 2, 2019

(54) METHOD FOR MAKING STEEL IN AN ELECTRIC ARC FURNACE AND ELECTRIC ARC FURNACE

(71) Applicant: Genrikh Alekseevich Dorofeev, Tula (RU)

(72) Inventors: Genrikh Alekseevich Dorofeev, Tula (RU); Pavel Rudol'fovich Yantovskiy, Moskovskaya obl. (RU); Konstantin Gennadievich Smirnov, Moskovskaya obl. (RU); Igor' Ivanovich Yastrebov, Tula (RU); Aleksandr Anatol'evich Protopopov, Tula (RU); Gennadiy Alekseevich Zinyagin, Belgorodskaya obl. (RU)

( * ) Notice: Subject to any disclaimer, the term of this patent is extended or adjusted under 35 U.S.C. 154(b) by 131 days.

(21) Appl. No.: 15/108,323

(22) PCT Filed: Dec. 26, 2014

(86) PCT No.: PCT/RU2014/000996
§ 371 (c)(1),
(2) Date: Jun. 27, 2016

(87) PCT Pub. No.: WO2015/102520
PCT Pub. Date: Jul. 9, 2015

(65) Prior Publication Data
US 2016/0333430 A1    Nov. 17, 2016

(30) Foreign Application Priority Data
Dec. 30, 2013    (RU) .............................. 2013158488

(51) Int. Cl.
*C21C 5/52*    (2006.01)
*C21C 5/56*    (2006.01)
(Continued)

(52) U.S. Cl.
CPC ............ *C21C 5/5264* (2013.01); *C21C 5/527* (2013.01); *C21C 5/5217* (2013.01);
(Continued)

(58) Field of Classification Search
CPC ..... C21C 5/5264; C21C 5/5217; C21C 5/527; C21C 5/562; F27D 1/0033; F27D 3/0025; F27D 3/0033; F27D 3/16
See application file for complete search history.

(56) References Cited

U.S. PATENT DOCUMENTS 4,514,218 A * 4/1985 Inagaki ................. C21C 5/5211
                                                          75/10.12
6,635,096 B1   10/2003  Wurth

FOREIGN PATENT DOCUMENTS

CA      2126116    *  2/1995
DE     19517151    *  3/1996
(Continued)

OTHER PUBLICATIONS

RU-2514241 Machine Translation of the Description (Year: 2014).*
(Continued)

*Primary Examiner* — Tima M McGuthry-Banks
(74) *Attorney, Agent, or Firm* — John Alumit

(57) ABSTRACT

A method of producing steel by charging a furnace with scrap metal and agglomerated oxy-carbon material into a workspace of a furnace, to reduce specific electricity consumption when melting. Increasing the iron output quantity by inputting electric energy, fuel, a carburizer, a flux and gaseous oxygen, using electric arc melting with decarburization of a metal bath, and releasing metal and slag from the furnace. Prior to melting, a portion of the material is loaded with a first portion of the metal charge into the central zone of the furnace, and the remaining material into the melted charge during melting 0.5-10 kg/min per 1 megavolt-ampere
(Continued)

Figure 1:
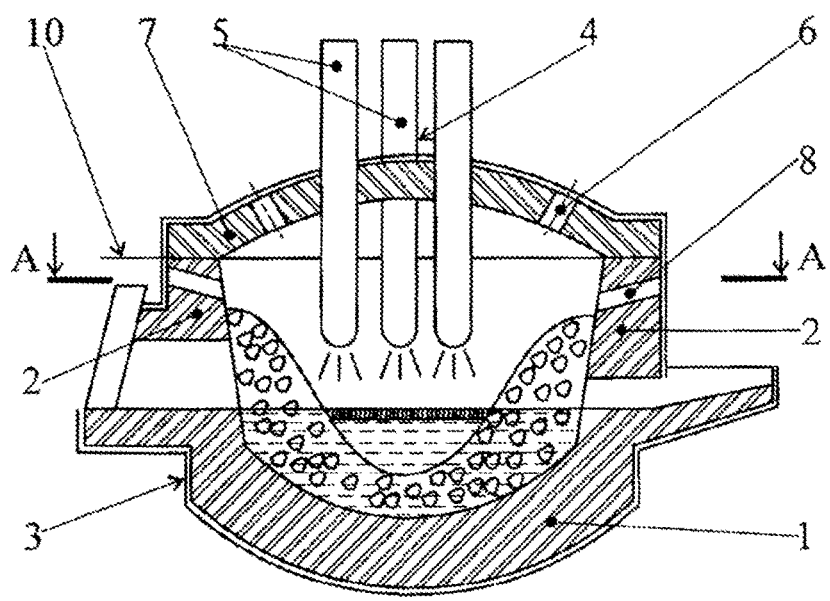

of electric arc transformer power. The oxy-carbon material size is between 5 and 80 millimeters.

6 Claims, 1 Drawing Sheet

(51) Int. Cl.
*F27D 1/00* (2006.01)
*F27D 3/00* (2006.01)
*F27D 3/16* (2006.01)
*F27B 3/08* (2006.01)
*F27B 3/18* (2006.01)
*F27D 1/02* (2006.01)
*F27B 14/06* (2006.01)
*F27B 14/14* (2006.01)
*F27D 11/10* (2006.01)

(52) U.S. Cl.
CPC ............ *C21C 5/5229* (2013.01); *C21C 5/562* (2013.01); *F27B 3/085* (2013.01); *F27B 3/183* (2013.01); *F27B 14/06* (2013.01); *F27B 14/14* (2013.01); *F27D 1/0033* (2013.01); *F27D 1/0043* (2013.01); *F27D 1/02* (2013.01); *F27D 3/0025* (2013.01); *F27D 3/0033* (2013.01); *F27D 3/16* (2013.01); *F27D 11/10* (2013.01); *F27B 2014/068* (2013.01); *F27D 2003/0075* (2013.01); *F27D 2003/164* (2013.01); *Y02P 10/216* (2015.11)

(56) References Cited

FOREIGN PATENT DOCUMENTS

| | | | |
|---|---|---|---|
| GB | 1116268 | * | 6/1968 |
| RU | 2034040 C1 | | 4/1995 |
| RU | 2103377 | * | 1/1998 |
| RU | 2104450 C1 | | 2/1998 |
| RU | 2514241 | * | 2/2014 |
| SU | 1165861 A | | 7/1985 |
| WO | WO 2013/098636 A1 | | 7/2013 |

OTHER PUBLICATIONS

RU-2103377 Machine Translation of the Description (Year: 1998).*
DE-19517151 Machine Translation of the Description (Year: 1996).*
Gudim et al. "Is There a Real Alternative to Scrap in Electric Furnace Steelmaking?" Russian Metallurgy (Metally), vol. 2008, No. 8, pp. 717-720. © Pleiades Publishing, Ltd. DOI: 10.1134/S0036029508080156 (Year: 2008).*
Dorofeev et al. "Synticonn—Original Metallic Charge for the Electric Furnace Steelmaking of High-Quality Steels." Russian Metallurgy (Metally), vol. 2009, No. 7, pp. 644-648. © Pleiades Publishing, Ltd., DOI: 10.1134/S0036029509070222 (Year: 2009).*

* cited by examiner

METHOD FOR MAKING STEEL IN AN ELECTRIC ARC FURNACE AND ELECTRIC ARC FURNACE

CROSS-REFERENCE TO RELATED APPLICATION

This application is a national stage patent application arising from PCT/RU2014/000996 filed on Dec. 26, 2014, and referenced in WIPO Publication No. WO2015/102520. The earliest priority date claimed is Dec. 30, 2013.

FEDERALLY SPONSORED RESEARCH

None

SEQUENCE LISTING OR PROGRAM

None

The inventions are related to the field of metallurgical production, and specifically to a method of producing steel and electric arc furnace (EAF) design for steel production.

There is a method of melting steel in a steel-melting unit, particularly in EAF, including layer-by-layer charge loading, consisting of limestone, composite, containing oxy-ferric and oxy-carbon materials, layer-by-layer loading of charging material and its melting, while 10-20% of carbon-containing material from the required amount to fully reduce ferric oxides is loaded along with limestone, and the remaining part is loaded along with oxy-ferric material, and after melting ⅓-½ of the total volume of the metal charge, gaseous carbon monoxide is supplied through the furnace hearth [Invention description of the Russian Federation patent NQ 2285726, dated Mar. 2, 2005, MPK S21S 5/52, published on Oct. 20, 2006]. This allows to efficiently control the thermal power of the oven, heating and melting process of the charge, as well as slag formation, which is achieved by an additional reduction of ferric oxides, contained in the charge and slag; foaming of slag and screening of arcs; additional burning of carbon monoxide in the oven and mixing the liquid alloy with slag-forming materials. As a result, thermal performance of EAFs and liquid metal output are increased, and the simplification of blending alloys is achieved.

This method is an alternative to the recommended steel-melting method, while using synthetic composite materials. There is some doubt as to the possibility of achieving the claimed technical result. Particularly, CO is a weak reducing agent in hearth furnaces and requires its significantly high consumption, and additional oxidation of iron, due to the contact with an oxidizing environment within the furnace, transitions into an oxide. Thus, the claimed reduction of electricity consumption is not achieved.

There are melting methods by EAF, which includes loading the furnace, loading scrap as a charge, bypass and replacement of electrodes, supply of electric power, fuel, gaseous oxygen, carburizer and flux, melting a metal charge, oxidation period (heating and decarburization of the metal bath), metal and slag output from the furnace into a ladle [See A. N. Morozov. Modern steel production in arc furnaces. 2nd edition, Chelyabinsk: Metallurgy, 1987, p. 41].

Yet another method of melting steel by EAF uses one of the metal charge components, along with scrap metal and oxy-carbon materials, designated to replace cast iron, steel scrap and parts of the carburizer [See Y. A. Bondarenko, G. N. Elansky, V. P. Lemyakin, et al. Experiment of melting steel in electric furnaces, using oxy-carbon bricks. Works of the fifth congress of steelworkers.—M.: Chermetinformatsiya, 1999. p. 218-219 and E. E. Ageyev, V. S. Antonov, V. K. Babich, et al. Practical application of oxy-carbon bricks in arc furnaces. Works of the sixth congress of steelworkers.—M.: Chermetinformatsiya, 2001. p. 237-240].

Oxy-carbon materials (OCM) are pelletized or pressed mixtures of carbon-containing materials (coke, graphite, various types of coal, and metallurgical, chemical, and other manufacturing waste, containing carbon) and solid oxidizers (concentrate, super-concentrate, powder particles of iron ore, and solid oxidizers (concentrate, superconcentrate, powder particles of iron ore, agglomerate residue), obtained from brick, pellet and other pressing methods.

Using OCM to melt steel in the EAF has numerous advantages, such as the following:

recycling of all slag, produced during the manufacturing process;

partial replacement of cast iron and scrap metal;

reduced consumption of a carburizer;

reduced content of phosphorus, sulfur and color metals;

steel price reduction.

Thus, this steel-melting method by EAF includes the filling of the furnace's workspace, loading of a charge, consisting of scrap metal and pelletized OCM, and, if required, adding a charge, bypass and replacement of electrodes, supply of electricity, fuel, carburizer, flux, gaseous oxygen, charge melting, heating of the metal and decarburization of the metal bath (i.e. oxidization period), output of metal and slag from the furnace. This steel-melting method is technically the closest one to the claimed method.

Basic deficiencies of this method are an increased specific consumption of electricity during the melting process and reduced iron output, as well as a limited amount of supplied OCM, which does not exceed 5% on average from the total mass of the loaded metal charge used in the melting process. The reason for these deficiencies is that the OCM is loaded along with scrap into the lower part of the EAF workspace.

Placing OCM chunks near the hearth of the furnace, under a layer of a metal charge, which has a large thickness, and far away from the burning area of arcs, makes heat transfer to the lower layers of the charge, where the OCM is, very difficult. This leads to the prolonged melting process of the OCM and an increase in electricity consumption.

Intensive OCM melting starts after the formation of the liquid metal bath at the bottom of the furnace. Furthermore, a part of the OCM will not melt in time and surfaces on the top of the metal bath, dissolving in scrap. The last deficiency, due to an increased content of ferric oxides in it, has oxidizing properties and has a low relative heating temperature. These factors make it difficult to reduce iron from its oxides by carbon that are present in OCM, thus lowering extraction of iron out of OCM and output of usable iron.

Altogether, these factors increase energy consumption and reduce iron output. All of these factors are the reason why this steel-melting process by EAFs, using OCM, did not have a wide usage. At the same time, this lead to a sharp restriction of OCM consumption, used during the steel-melting process by EAF.

The issue, which is being solved by the first invention of the group, and the achievable technical result yield to a decrease in a specific consumption of electricity to melt metal charges and an increase in iron output from OCM, as well as an increase of their relative amount in the total mass of the charge.

To solve this issue and achieve the claimed technical result in the steel-melting process by EAF, which includes filling of the furnace's workspace, loading the charge, consisting of scrap metal and pelletized OCM, and, if required, additional loading of the charge, bypass and replacement of electrodes, supply of electricity, fuel, carburizer, flux, gaseous oxygen, charge melting, metal heating and decarburization of the metal bath, output of metal and slag from the furnace, a part of OCM, 10-90% of its total consumption during the melting process, is loaded at the same time with scrap for the first portion of the metal charge prior to the melting process, with specific loading speed of 0.5-10 kg/min at 1 MVA EAF transformer power, and the typical OCM chunk size is selected in the 5-80 mm range.

Furthermore:

OCM is supplied to the central area of the furnace, which is adjacent to the burning zone of electric arcs and limited to the size not exceeding $D=(d_p+3.5\ d_{EL})$, where $d_p$ is a diameter of electrode disintegration, and $d_{EL}$ is a diameter of electrodes;

ratio of carbon and oxygen, introduced by a solid oxidizer of the OCM and/or contained in ferric oxides, limited to the range of 0.15<C/O<5.00, for the following content of initial components, by mass %:

Solid oxidizer: 40-95;

Carburizer: 5-60;

Adhesive above 100% in the amount of 1-10% of the total mass of the carburizer and solid oxidizer;

Additionally, the OCM includes iron-containing metal particles in the amount of 5-30% of the total mass of the material;

Additionally, the OCM contains slag-forming components in the amount of 0.1-10.0% of the total mass of the material. Oxides and/or fluorides of elements that are highly similar to oxygen in comparison to iron, at 1,550° C., namely Ca, Na, K, Ba, Al, Ti, Zr, Si, Mn, V, Cr and B, are used as slag-forming components.

Corresponding equipment, namely EAF is required to implement such a steel-melting method. A typical EAF [See internet resource Free Encyclopedia, Wikipedia, http://ru.wikipedia.org/wiki/, term: Electric Arc Furnace] consists of the melting bath (workspace), arc power regulator and auxiliary process mechanisms that open (close) the furnace dome, pump out slag and pour out metal. Steel melting is performed in the workspace, which is defined at the top by a dome-shaped roof, at the bottom by a spherical bottom and at sides by walls. A fire-resistant setting of the furnace hearth and walls is encased in the metal housing. A removable roof may be made from fire-resistant bricks that are placed on the supporting rim, or they may be made from water-cooled panels, just like walls. Current-conducting electrodes, which can move up and down due to special mechanisms, are inserted through three symmetrically positioned apertures in the dome into the workspace. A furnace is typically supplied with a three-phase current, but there DC current furnaces as well. A modern powerful EAF is mostly used as an appliance to melt the charge and obtain liquid half-product, which then will be brought up to the required content and degree of purity by an out of furnace process in a ladle.

Melting in EAF, after its inspection and repair of damaged brick linings (fettle), starts with loading of the charge. In modern furnaces, the charge is loaded from the top, using a loading basket. After loading is complete, electrodes are inserted into a furnace, high-voltage switch is turned on and the melting process begins. The control of the power output is done by shifting the positions of electrodes (the length of the electric arc) or by changing the electrode voltage. After the melting period, a layer of metal and slag is formed in the furnace. Slag is foamed by carbon-containing materials to close arcs, to improve its discharge and to reduce metal loss.

The discharge of finished steel and slag into a steel ladle is performed through a steel-discharge hole and chute by inclining the workspace (or if a furnace is equipped with a discharge at the bottom, then through that way). An operating window, covered by a lid, is designed to control the melting process (to measure metal temperature and sampling the chemical content of the metal). Also, an operating window may be used to supply slag-forming and alloying materials (for smaller furnaces). For modern superpowered furnaces, the supply of slag-forming materials, during the melting process, is performed through a special hole in the dome by a conveyer. Carbonaceous materials that foam slag are supplied into the furnace or portionally through the dome, or by injection burners by a gas jet. Before and during the discharge, alloying materials and deoxidizing agents are added into a steel ladle, and slag-forming materials are added during the separation of slag.

The deficiencies of EAFs are a high local overheating under electrodes; difficulty of mixing and averaging out a chemical content of the metal; and significant amount of combustion products and noise during the process. However, the main indication of furnace performance inefficiency is its excessively high local concentration of energy, the higher it is, the more powerful is the furnace. Furthermore, the existing furnaces are not designed for a specialized supply of OCM into a metal bath, aside from loading them as part of scrap.

The issue, which is being solved by the second invention of the group, and the achievable technical result, is through a creation of a device to implement the claimed steel-melting method, and, thus, reduce the specific consumption of electricity to melt metal charges and increase in iron output from OCM, as well as an increase of their relative amount in the total mass of the charge.

To solve the mentioned issue and achieve the claimed technical result, an EAF, consisting of lined highly fire-resistant materials, forming the dome and walls of the housing, with apertures for electrode insertions and supply of granular materials, and dome-shaped roof with electrode holders and electrodes, is designed to implement the inventive method, while the housing walls is designed with, at least, three placed apertures along the perimeter to supply OCM, placed below the upper marking on the housing at 0.2-1.0 m, into the central zone of the furnace. Additionally, the apertures to supply OCM into the central zone of the furnace are distributed along the wall perimeters, mostly placed between two neighboring electrodes.

Figure 2:
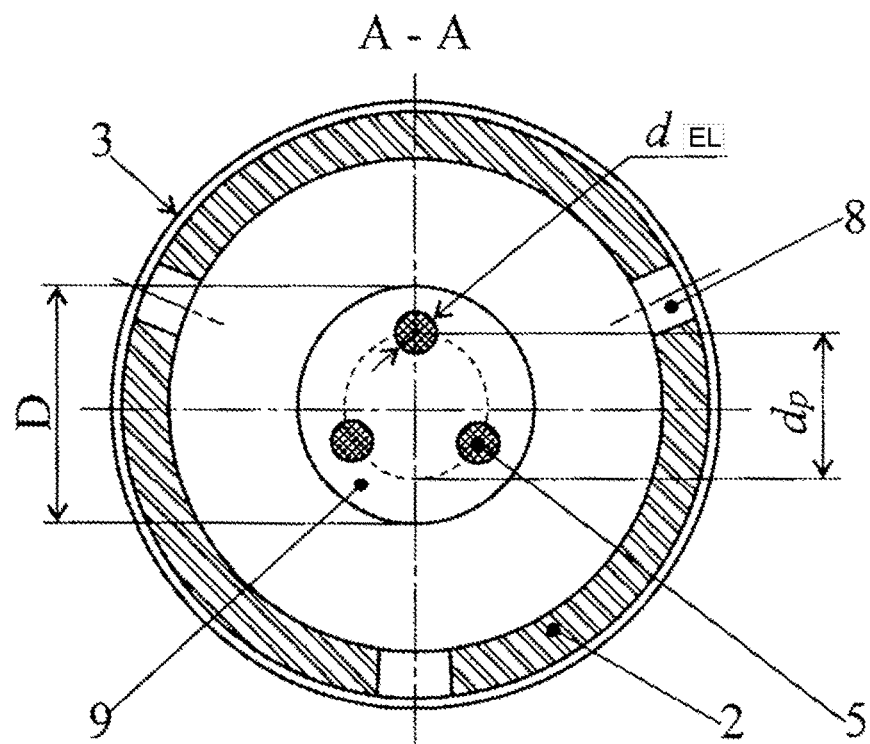

Inventions are shown on drawings, where:

FIG. 1 shows the general view of an EAF to implement the steel-melting method by using OCM;

FIG. 2 shows a cross-section A-A of FIG. 1—preferred placement of apertures to supply OCM into the central zone of the furnace relative to electrodes Thus, the steel-melting method in a predominantly three-phase AC voltage EAF includes loading the furnace's workspace, loading the charge, consisting of scrap metal and chunks of OCM, and, if required, one or several additional loads of charges, supply of electricity, fuel, carburizer, flux, gaseous oxygen, charge melting, heating of metal and decarburization of the metal bath (i.e. oxidization period), and discharge of metal and slag from the furnace. Part of OCM in the amount of 10-90% of its total consumption per melt is loaded into the furnace simultaneously with the first portion of the metal charge prior to melting process, and the remaining amount of OCM is supplied into the molten charge during the melting process with specific loading speed of 0.5-10 kg/min at 1 MVA EAF transformer power, while the typical size of loaded OCM chunks is limited to 5-80 mm.

OCM is supplied to the central area of the furnace, which is adjacent to the burning zone of electric arcs and limited to the size not exceeding $D=(d_p+3.5\ d_{EL})$, where $d_p$ is a diameter of electrode disintegration, and $d_{EL}$ is a diameter of electrodes; In other words, the central zone of the furnace is diameter D of the circumference around electrodes. As a rule, this zone's area is no more than 30% of the cross-sectional area of the furnace's workspace.

ratio of carbon and oxygen, introduced by a solid oxidizer of the OCM and/or contained in ferric oxides, limited to the range of 0.15<C/O<5.00, for the following content of initial components, by mass %:
Solid oxidizer: 40-95;
Carburizer: 5-60;

Adhesive above 100% in the amount of 1-10% of the total mass of the carburizer and solid oxidizer; This means that OCM content and its consumption per melt is determined depending on the type of the steel, which became possible due to numerous experiments that allowed for OCM application optimization for metallurgical processes of electrical arc steel melting and create a corresponding scientific basis.

Iron ore concentrate, slag, iron ore, agglomerate, partially reduced iron of direct reduction and/or their mixtures are used as a hard oxidizer, while coke, graphite, charcoal, coal particles, thermoanthracite and their mixtures are used as a carbon-containing reagent. Liquid glass, various types of cement, molasses, wood glue, bentonite and their mixtures, as well as biological agents (flour, etc.) may act as an adhesive.

The OCM may include iron-containing metal particles in the amount of 5-30% of the total mass of the material. Metal particles act as a catalyst in reduction process of iron out of its oxides by carbon, which is contained in the carburizer.

Additionally, the OCM contains slag-forming components in the amount of 0.1-10.0% of the total mass of the material. Oxides and/or fluorides of elements that are highly similar to oxygen in comparison to iron, at 1,550° C., namely Ca, Na, K, Ba, Al, Ti, Zr, Si, Mn, V, Cr and B, are used as slag-forming components.

The EAF for this claimed steel-melting method consists of the bottom (1), lined with high-resistant materials, walls (2) and housing (3) with apertures (4) to insert electrodes (5), hole (6) to supply granular materials, involved in steel melting, and dome-shaped removable roof (7) with electrode holders (conditionally not shown) and a three-electrode unit (5). Walls (2) are designed with at least three apertures (8) along the perimeter to supply OCM into the central zone (9) of the furnace, located below the upper mark (10) of the housing (3) at 0.2-1.0 m. It is recommended to distribute apertures (8) along the perimeter of the walls (2), advantageously positioning them between two neighboring electrodes (5) (or oriented in the direction between two neighboring electrodes (5). This is done to eliminate the possibility of bombarding supplied OCM bricks with electrodes (5), which could damage them, as well as to eliminate the possibility of loading OCM beyond the central zone (9) of the furnace, restricted by diameter D, since in this case additional energy will be required for its melting, which leads to the zone's overheating, directly adjacent to electrodes (5).

Let's analyze the significant points of inventions.
The central zone (9) in EAF differs from other workspace volumes by an enormous amount of emitted heat energy and its maximum concentration, reaching 10 MVA/m$^3$ in a current generation of ovens, as well as high melting temperature level at 4,000-15,000° K and a very significant melting temperature of an initial charge and final product (liquid metal), no more than 1,700° C. Due to these factors, the melting properties of all loaded materials into the furnace, including OCM chunks, in the burning zone of electric arcs (5) and zones beyond its boundaries and at the edges of the furnace, radically differ.

In the first case, melting is performed with excessive energy consumption and at very high temperatures, significantly exceeding melting temperatures of initial materials and final product (i.e. steel). One of the consequences of such process is incomplete heat absorption of supplied energy, significant heat loss and overconsumption of electricity.

In the second case, which differs from the first case, the transition of solid charge components into a liquid state, while forming, respectively, metal and slag, is performed with heat deficiency and operating temperatures that do not exceed temperatures of metal and slag, i.e. 1,700° C. The proposed method, in comparison to others, is based on loading some part of OCM together with scrap even before the melting process, and, as a rule, a more significant part of OCM is loaded into the burning zone of arcs during the melting process, when more electricity is supplied to the electric furnace. Supplied materials significantly increase heat absorption of the charge, thus lowering heat loss and energy consumption.

A special characteristic of the furnace's central zone energy along with a change in the process of supplying OCM to the furnace predefines an exceptionally fast melt of OCM solid chunks and their transition to a liquid phase. Due to that, basic OCM components—iron oxides of a hard oxidizer and carbon, which is contained in the carburizer, react with each other, which happens with quite high specific speed approximately at 5-40 kg/(s·m$^3$). Products of this reaction of carbon oxidation and iron reduction are metallic iron and carbon monoxide.

The first one flows down into a metal bath, and the latter one serves as a source of additional heat supply in the furnace due to afterburning of CO and $CO_2$, thus reducing specific consumption of electricity to melt metal charge.

The heating and melting of OCM is done due to an additional accumulation of part of the heat, which was not absorbed by the charge due to its limited ability to consume entire energy and thus has heat loss. This circumstance ensures a reduction in specific consumption of electricity to melt the charge.

The proposed method also ensures a fast and complete reduction of iron from its oxides by carbon from OCM and increase extraction of iron and output of useful one. In this case, OCM melting also leads to the formation of liquid slag phase, which improves arc burning and stability of supplying energy to the furnace. This results in additional electricity savings, which is attained due to a reduction in energy loss while arcs are burning.

Current EAFs have a sole, so-called "fifth" hole 6 in the furnace roof to supply granular materials during the melting process. Switching to adding materials during the melting process requires changes in the current EAF design to create a capability for continuous and even supply of required materials, including OCM, through three or more apertures 8 in walls 2, placing them in the upper part of the furnace housing 3 below the level of the upper mark 10 at 0.2-1.0 m. This allows supplying OCM from the very beginning of the melting process at any bulk density of scrap metal, as well as makes it possible to control the consumption of OCM in a wider range and much smoother.

The main feature of the melting process in EAF is the maximum amount of supplied electricity for the purpose of the fastest charge melting and reduction of continuity of this stage, which takes most of the time of the electric melting process. EAFs, especially the latest generation, have a high-powered transformer, reaching up to 1,500 KVA per ton of steel, which is why a significant amount of highly concentrated energy is added to the charge. This amount significantly exceeds an ability of the solid charge to accumulate and absorb the supplied heat. Due to the limited ability of the charge to absorb the supplied energy, a significant part of it is used inefficiently, being spent to evaporate some parts of the metal, overheating the charge, metal and gases, as well as an increased emission to the roof 7 and walls 2 of the furnace etc. These factors increase heat loss and energy consumption and reduce heat efficiency of EAF during the melting process.

OCM within the charge supplied during the melting process, fills up the space inside the layer of melting charge, thus increasing its bulk density. Since they are relatively small in size, these materials have a more developed heat transfer surface in comparison with metal charge chunks. Furthermore, OCM pellets are related to, in comparison to scrap metal, to thin bodies and therefore have a faster heating speed, and respectively, less time to melt. Due to these factors, OCM increase an accumulating capability of the charge and its melting speed, thus increasing the level of energy absorption, discharged during arc burning and reducing its loss. Respectively, this reduces specific consumption of electricity and melting duration.

Besides the physical influence on heat exchange in the arc burning zone, which is due to increased heat absorption from burning arcs, OCM has an additional cooling effect, based on a chemical reaction between carbon and iron oxides of OCM. This reaction is endothermic and therefore additionally cools the zone, where these materials are located, thus increasing the absorption speed of heat that is supplied to this zone. Therefore, OCM application in EAF melt, by supplying it into the central zone 9 of the furnace, leads to a transfer of some heat to the reaction of carbon and iron oxides interaction. Thus a reduction of irreversible heat loss and specific consumption of electricity is achieved. The described effect is related to a chemical cooling of burning arc zone and adds a purely physical effect of OCM on the temperature in that zone, increasing the cooling effect.

The endothermic reaction is related to the reaction of reduction of iron from its oxides by carbon and has significant heat consumption. However, in the claimed method, losses for this reaction is ensured by the heat, taken from the energy, discharged from the furnace and considered a loss. This eliminates additional heat loss when using OCM.

Iron and iron monoxide are the products of the interaction reaction of carbon and iron oxides in OCM, supplied during the melting process. The iron, obtained from OCM, is transferred to a metal bath, thus increasing the iron output. Furthermore, it has an original characteristic and distinguished by its increased purity in relation to remaining elements, such as Cu, Sn, Mo, Cr, Ni, etc. Significantly high temperatures in the central zone of the furnace, developed heat exchange surface of OCM chunks (pellets), large reaction contact surface of the carburizer, as well as high intensity of heat transfer ensures the required and sufficient conditions for this reaction, including a complete reduction of iron. The resulting carbon monoxide is a source of additional heat, emitted from within of the charge chunk. Filtered through the layer of a melting charge chunk, it is burnt until it becomes CO, dissipating 6.55 kWh of heat per every kilogram of carbon, contained in OCM. The presence of the solid charge, its developed surface, relatively low temperatures, as well as a combination of CO formation zones, its additional burning and heat absorption create conditions for more complete CO burning until it becomes $CO_2$ within the charge and increased heat transfer of burning of surrounding materials. These values significantly exceed similar ones of known methods, where after-burning and heat transfer is done at the beginning of the melting process, when the bath is in a hybrid state and covered in foamed slag. These factors significantly worsen conditions for after-burning and heat recycling.

From the above, it leads that OCM usage during the melting process, based on its supply to furnace during the melting process, significantly changes behavioral characteristics during electric melting process of these materials and EAF energy in general. After supplying OCM to the high-temperature zone and its subsequent heating of material chunks, iron reduction reaction from its oxides by carbon, contained in OCM, begins and iron output increases. Due to that, physical and chemical cooling of the burning zone is achieved. It significantly increases the level of heat absorption and eliminates its loss. Carbon monoxide is after-burned to $CO_2$ during the filtration process through the charge volume. Due to this, a combination of CO formation zone, its after-burning to $CO_2$ and heat absorption is achieved, which significantly increases after-burning efficiency and carbon as energy carries in general, thus reducing consumption of electricity and melting time.

This is one of the advantages of the proposed method compared to known ones, where OCM begins to actively melt only at the conclusion of the melting process. At that moment, a hybrid state metal bath is formed in the furnace, covered by relatively cold foamed slag. Therefore, the after-burning process of CO to $CO_2$ and heat transfer to the furnace bath passes in unfavorable conditions. Due to that, the resulting effect of using carbon is significantly reduced and does not exceed 3.1-3.8 kWh/kg of carbon in comparison with 4.5-4.9 kWh/kg in the proposed method.

Thus, the proposed method of melting steel, based on the application of a special system to load OCM, significantly improves the energy consumption during the melting period, thus ensuring significantly lower consumption of electricity.

10-90% of values are defined by wide boundaries of change in specific power of the furnace transformer and cooling effect of OCM chunks of various content. Depending on the ratio of these parameters, an amount of OCM supplied during the melting process, may change by 10-90% from their consumption per melt. In case where that amount is less than 10%, the achieved effect is reduced, limiting parameters of the proposed method. When OCM consumption during the melting process is more than 90%, the efficiency of the proposed method is also reduced. It is defined, in this case, the amount of OCM, supplied along with scrap, does not ensure the necessary amount of carbon monoxide, which weakens the mixing intensity of metal bath and prolongs the melting process. Besides that, a limited amount of the forming monoxide reduces the amount of heat supplied to melting materials and hybrid state bath. Both factors, taken together, result in increase of energy consumption per charge melt. Therefore, the referred interval of OCM consumption during the melting process, which equals to 10-90% ensures an achievement of maximum specific heat consumption per charge melt.

A typical size of OCM chunks in the range of 5-80 mm represents an average of three sizes of a single chunk. This chunk size range was taken from an assumption of a possibility to place them in open spaces of metal scrap and capability to supply OCM through apertures in walls 2 of furnace housing 3. When chunks are less than 5 mm, an effect of their emergence through chunks of scrap into the lower part of the metal load and their exit from the melting zone is observed. This leads to OCM accumulation in charge layers, adjacent to the bottom 1, and slows down their melting, shifting it to the conclusion of the charge melt. Therefore, lowering the OCM chunk size to less than 5 mm is not preferred. Chunks more than 80 mm in size have more tendency to hang ups and difficult to supply into the furnace. Therefore, further size increase is not feasible.

As a whole, a combination of above parameters, namely supply of 10-90% of OCM during the melting process with individual chunk size in the 5-80 mm range, ensures thorough melting of these materials at the beginning melting stage, with quite high speed and due to heat, which is lost due to the charge's inability to absorb all of the supplied heat from electric arcs. Furthermore, a total reduction of iron, contained in oxides of solid oxidizers, is achieved. Thus the iron output increases.

A significant value is provided by an earlier, from the beginning of melt, formation of carbon monoxide, which is formed along with iron as a reaction product of carbon and oxygen of iron oxides from a solid oxidizer. Thus, the formed amount of carbon monoxide, reaching 600 m$^3$/t of material, plays a positive role. Monoxide plays the role of an additional energy carrier, since it is after-burned to $CO_2$, emits an enormous amount of heat—6.55 kWh per one kilogram of carbon. The presence of solid chunks of charge improves after-burning heat absorption in comparison with known methods—60-80% instead of 30-50%, thus giving an additional electricity savings.

Introduction of monoxide into the furnace's atmosphere decreases the oxygen content and, as a whole, an oxidizing potential of the gaseous state in relation to the metal scrap surface, thus additionally reducing iron oxidation of metal scrap and increasing the iron output from the metal charge. OCM, according to the claim, is supplied to the central zone 9 of the furnace with sizes, not exceeding $D=(d_p+3.5 d_{EL})$, whose area is no more than 30% of the total cross-sectional area of the furnace at the roof level.

A selection of this parameter is defined by specific energy of EAF, which means that all electricity transition to heat and heat dissipation happens within the central zone 9 of the furnace, comparable in size to electrode 5 circle diameter $d_p$. For modern high-powered furnaces of the latest generation, an absolute value of this parameter is 1.3-1.6 m. A presence of a highly concentrated heat source at the furnace center, predetermines an advantageous melting of solid materials of a metal load in the arc-burning zone. Peripheral zones of the charge melt significantly later, after thorough melting of wells and formation of a unified melting zone. Especially high concentration of energy in the arc burning zone and its adjacent zones explains the necessity to supply OCM exactly into the central zone 9 of the furnace, which is located below electrodes 5 and to the sides of them.

If supply zone size does not the exceed the value of $D=(d_p+3.5 d_{EL})$, then the supplied OCM get into the zone of the highest temperatures and maximum concentration of energy. Thus, an earlier melting of OCM and a faster completion of the reaction between carbon and iron oxides of a solid oxidizer, whose target product is iron, reduced by carbon from its oxides and carbon monoxide, is ensured. The latter is used as a source of additional heat in the form after-burning energy and factors, which reduce an oxidizing potential of the gaseous state of EAF and thus increasing the iron output from the charge. The recommended interval of the specific feed speed of OCM to the furnace is 0.5-10.0 kg/min at 1 MVA of the transformer power. When the loading speed is below 0.5 kg/min at 1 MVA, the achievable effect in relation to a reduction in energy consumption and increase in iron output is significantly reduced and, therefore, the further reduction of the value is not feasible. When the OCM loading speed exceeds 10 kg/min at 1 MVA, an excessive cooling of arc burning zones and adjacent zones is observed. This leads to a prolonged melting process and increase in energy consumption. Besides that, there is a danger of incompletion of the main OCM reaction, i.e. a reaction between carbon and iron oxides, which determines the efficiency of application of these materials. Thus, the applicable range for loading speed is 0.5-10.0 kg/min, which is the most rational solution. The main dominating characteristic of OCM is the carbon-oxygen (C/O) ratio, which generalizes a joint impact on efficiency of application of these composite materials and selection of their content. The carbon to oxygen ratio in OCM is selected in the range of 0.15<C/O<5.00. If the C/O ratio in OCM is below 0.15, then the cooling effect of this material will be close to maximum, which equals to the cooling capability of the solid oxidizer. One of its consequences is the necessity to decrease the OCM amount per melt, which reduces the efficiency of the proposed method. Thus, a C/O ratio reduction to below 0.15 is not preferred.

In those cases, when C/O ratio is above 5.00, the cooling capability of the material will start to decrease dramatically. The cause of this is a high carbon content, discharged from OCM into a metal bath, and leads to an excessive metal carbonization. Thus, increasing the C/O ratio to above 5.00 is irrational. Therefore, both C/O ratios, below 0.15 and above 5.00, are not preferred.

The OCM component content limits and contents of materials are determined by the following method. If it consists of less than 40% solid oxidizer, and the carburizer content is more than 60%, then the entire oxygen of iron oxides of the solid oxidizer is completely consumed to oxidize parts of carbon, while the remaining significant amount of carbon is introduced to the bath, thus carbonizing it. Furthermore, the amount of carbon, introduced to the bath, is quite high. Increasing the carbon content decreases the cooling effect of OCM on the arc burning zone temperature, as well as it requires additional consumption of oxygen and electricity, thus prolonging the oxidation process and the whole melting process, in general. At the same time, metal dephosphorization conditions worsen due to a reduction of the iron oxide amount in slag. Thus, reducing the solid oxidizer content to below 40% and increasing carbon-containing reagent to above 60% is not feasible. At an increased content of solid oxidizer in OCM of above 95% and, respectively, a reduction of the carburizer content to below 5%, an amount of iron oxides, acting as oxygen donors, significantly exceed their amount, which are required to remove all carbon from OCM. Excessively high content of the solid oxidizer increases the cooling effect of OCM to the level nearing the pure form of the solid oxidizer and equals to 3-4 units of the cooling capability of scrap metal. This significantly reduces OCM consumption per melt. The resulting excess of iron oxides is sent to slag, increasing oxidation and mass of slag. These factors negatively impact electric melting parameters, decreasing iron output, increasing oxygen content in the final metal product, increasing consumption of deoxidants, increasing contamination of steel by oxygen content, as well as reducing the furnace lining stability. All of this restricts the limits of oxidizer and carburizer content in OCM to 90 and 5%, respectively. An adhesive in the OCM content in the amount of 1-10% above 100% of the total mass of the carburizer and solid oxidizer, ensures the proper mechanical stability of pellets and does not significantly impact the melting process.

OCM may contain iron-containing metal particles in the amount of 5-30%. The presence of such particles significantly speeds up the main reaction between carbon and hard oxidizer that happens within OCM, when it is heated and melted. The presence of metal particles within OCM increases the reduction of iron from its oxides by carbon and the speed of this process.

At their relatively low content within OCM, below 5%, the benefit of its impact on the reaction kinetics is weakened. Furthermore, the positive results do not outweigh complications in technology to obtain chunks of material. Increasing the content of metal particles within OCM to above 30% results in a significant increase in adhesive consumption due to the reduction in stability of OCM chunks, as well as due to process complications, related to OCM chunks. Therefore this parameter is optimal at 5-3% range.

OCM may contain 0.1-10.0% of slag-forming components. Their content within OCM ensures an earlier formation of liquid slag, during the melting process, and as shown in experiments, increases the stability of electric arcs burning and reduces their energy loss. Furthermore, a fast formation of slag improves conditions to remove phosphorus after the melting process is complete. A reduction in slag-forming materials to below 0.1% is not preferred, since it reduces the efficiency of its impact. Increasing those materials to above 10.0% is also not preferred, since it reduces the relative content of main components of OCM, i.e. carbon and iron oxides. 0.1-10.0% content is the most optimal range.

The existing EAFs have only one hole to supply bulk materials during the melting process, through the furnace dome. For modern furnaces that are able to operate with significantly large amount of materials, supplied during the melting process, one hole may not be sufficient. The situation is further complicated by the tendency to continuously reduce the bulk density of the scrap metal, which leads to completely filling the whole space of the furnace, almost up to the dome 7. Naturally this leads to the reduction in gaps in the metal load and complicates an ability to supply OCM at the initial stage of the melting process, thus limiting its consumption. The solution to this problem is to increase the throughput by increasing the number of apertures, namely in walls 2 of the furnace housing 3, placed along the perimeter with strategic positioning between two neighboring electrodes 5 and having at least three times the number of electrodes 5, and their positions below the level of the upper mark 10 of the housing 3 at 0.2-1.0 m. This allows inputting OCM from the beginning of the melting process at any bulk density of the scrap metal and makes it possible to evenly control the OCM consumption in a wide range. Furthermore, electrodes 5 are not damaged by the incoming flow of OCM pellets, and the latter are guaranteed to get to the central zone 9 of the furnace. Thus, the even distribution and thorough melting of materials, without the formation of conglomerates of accumulated unmelted OCM, is ensured. The steel-melting method is EAF is performed the following way.

After completing the removal of metal and slag from EAF, its workspace is loaded, thus bringing the furnace to an initial state. The first bucket load consists of scrap metal and chunks (pellets) of OCM, having the chunk size in the range of 5-80 mm, with the bonding base of 1-10% Portland cement, made by vibration molding, for example. The proper amount of OCM is taken, calculated by 10-90% from the total consumption per melt. Power, fuel, gaseous oxygen and flux are supplied. At the same time and in parallel, from the moment of charge melting, OCM is supplied into the furnace workspace through a number of apertures 8 in walls 2 of furnace housing 3 at specific speed of 0.5-10 kg/min at 1 MVA of estimated power of the transformer. These chunks partially fill up the gaps that remain in scrap metal. The scrap metal that is currently used has a reduced bulk mass, approximately 0.5 t/m$^3$. Due to that, some gaps within scrap metal exceed 90% and take up a prevailing part of the total charge volume. The presence of free cavities within a layer of the initial metal load ensures the placement of incoming OCM in its volume.

At a high bulk density of scrap metal, it is preferable to supply OCM at 1-2 minutes after the beginning of the melting process. Thanks to this, a part of the solid charge already melts, thus freeing some workspace in EAF and creating additional free spaces between the scrap metal surface and the furnace dome 7.

The incline angle to supply materials that flow through apertures 8 in walls 2 of the EAF housing 3 in combination with chunks of OCM, improves the ability to make it to the central zone 9, a part of which serves as an arc burning zone, limiting the size to $D=(d_p+3.5\ d_{EL})$ maximum, which exceeds 30% of the cross-sectional area of the furnace's workspace. Thus, the supply of OCM into the central zone 9, located below hot electric arcs and restricted from sides by walls of unmelted charge, is ensured.

The consumption rate of supplied materials is 0.5-10.0 kg/min at 1 MVA power of the transformer of the furnace, based on maintaining the feed speed at the level that corresponds to their speed flow, or somewhat below it, which is determined by the amount of supplied power. Gradually, the material consumption is increased. This is done as the charge continues to melt, as cavities (wells) form within a metal load layer, free from the melted charge and form below electrodes 5 in the unified melting zone. After the first stage, i.e. melting the part of the first bucket, namely 50-65% of the metal load, the furnace is turned off and OCM supply is stopped. Then, the second bucket of scrap metal is loaded and the furnace is turned on and OCM is supplied again. The supply of these materials stops after freeing up walls 2 from the solid charge, which screens furnace lining from arcs, and the formation of the hybrid state metal bath with scrap metal chunks immersed in it. This corresponds to the final stage of the melting process, which passes at the flat surface condition of the bath, in conditions of direct emission of arcs on walls 2 and furnace dome 7. After that, the melting process continues along the standard process, similar to known melting methods.

At the beginning of the melting process, the supply of OCM loads to the charge is based on the presence of the large number of gaps in it, which are the majority of the charge volume and the total workspace of EAF. Further melting of the initial solid charge, based on scrap metal, which has a relatively low bulk density, around 0.4-0.6 t/m$^3$, is followed by a formation of free spaces within scrap metal layer, already mentioned above as wells. The latter ones are cavities through the whole metal charge, from the dome 7 to the bottom 1. Their shape closely resembles a cylinder, whose walls consist from fragments of materials that form the initial metal load. Wells form due to the transition of the solid charge, located below electrodes 5 and to their sides in a molten state and flowing the formed melt to the lower part of the furnace, down to bottom 1. Thus, the furnace workspace begins to free itself from charge chunks and forming cavities within the metal load, free of solid materials. This eases conditions to supply OCM to the workspace and allows to increase its consumption.

After electrodes 5 pass over all initial metal load and after they are lowered to their lowest position and arc burning transition to the operating mode, in the hybrid state bath, located on the furnace bottom 1, the melting process of charge chunks, which form side walls of wells, and expansion of initially formed free gas cavities within the metal load, begins.

Low bulk density of scrap metal predetermines a relatively small diameter of wells at the moment of their formation, expressed by $d_K=1.5d_{EL}$. Supply and/or presence of OCM chunks within the metal charge increases the ratio of well diameter to electrode diameter. When the relative diameter of wells reaches $d_K/d_{EL}=2$ or more, then the formed wells combine into one single melting zone, located in the central zone 9 of the furnace, below electrodes 5. This zone, from its sides, is formed by yet unmelted charge chunks, which are, in turn, supported by walls 2 of EAF housing 3.

As a result of partial melting of the solid charge, located below electrodes 5, some workspace is freed from scrap metal. It significantly improves OCM supply to the furnace and increases the feed speed, as well as ensures their ingress, supply and their priority placement at the surface of the liquid metal bath, formed in the process of melting.

After loading the second bucket, OCM chunks appear within the metal load at approximately at the middle of the workspace of the furnace. Furthermore, they are in the center of the moving path of electrodes 5. This creates the required and sufficient conditions for the efficient usage of OCM potential, from a point of view of the reaction of carbon and oxygen of the solid oxidizer, contained in this material, as well as from a point of view of after-burning of CO to $CO_2$ and absorption of that heat by melting materials and metal bath. At the same time, this speeds carbonization of the bath, which, in turn, speeds up the melting process and reduces energy consumption.

Thus, the supply of some OCM pellets during the melting process significantly changes the melting technology for the better and increases efficiency of its application.

The carbon to oxygen ratio, supplied by iron oxides of the solid oxidizer, is selected and maintained in the range of 0.15<C/O<5.00. The efficiency of the proposed method increases when metal particles, containing 5-30% of iron, are added to OCM content. A presence of metal iron reduces the temperature of the beginning of the reaction of carbon and iron oxides, as well as speeds up the flow of this reaction. In turn, it increases the reduction of iron speeds up the formation of carbon monoxide. The earlier formation of this gas improves the conditions for after-burning and heat transfer to melting materials of the metal load, as well as increases the duration of heat exchange of charge chunks with heat, formed in the after-burning process of CO to $CO_2$.

An increase in efficiency of the proposed method is helped by adding slag-forming components of oxides and/or fluorides of chemical elements to OCM content, which, in comparison to iron, are closer to oxygen at temperatures above 1,550° C., in the amount of 0.1-10% from the total mass of the material.

As a result of applying this group of inventions, steel-melting methods and EAF were created for its implementation, which, in the end, significantly lowered the specific consumption of electricity to melt the metal charge and increased iron output from OCM, as well as increased their relative amount in the total mass of the charge.

What is claimed:

1. A steel-melting method in an electric arc furnace (EAF), comprising:
    loading a charge in a furnace's workspace, consisting of scrap metal and Oxycarbon materials (OCM),
    supplying electric energy, fuel, a carburizer, a flux and gaseous oxygen in addition to the charge,
    heating and melting the charge using electric arcs with decarburization of a metal bath, and releasing a resulting metal and slag from the furnace,
    WHEREIN prior to melting, a portion of the OCM, restricted to no more than $D=(d_p+3.5\ d_{EL})$, where D is the size of the the diameter of the central zone of the furnace, $d_p$ is a diameter of disintegration of electrodes, and $d_{EL}$ is a diameter of electrodes, is loaded into the central zone of the furnace, adjacent to a burning zone of the electric arcs, simultaneously with a first portion of the OCM in an amount of 10-90 percent of its total mass consumption per melt while a remaining OCM amount is added to the melted charge as melting proceeds with a specific loading speed of 0.5-10 kg/min at 1 MVA of nominal power of EAF, while OCM size is in the range of 5-80 mm.

2. The method of claim 1, wherein a ratio of carbon to oxygen, is introduced by a solid oxidizer and/or contained in iron oxides, at a range of 0.15<C/O<5.00, with the following content of initial components, by mass percent: solid oxidizer at 40-95 percent, carburizer at 5-60 percent and adhesive at 1-10 percent of the total mass of the carburizer and solid oxidizer.

3. The method of claim 1 wherein the OCM additionally comprises iron-containing metal particles in an amount of 5-30 percent of the total mass of the OCM.

4. The method of claim 1, further comprising the step of forming the OCM with slag-forming materials in an amount of 0.1-10.0 percent of the total mass of the OCM, wherein oxides and/or fluorides are used as slag-forming components, and are chosen from the group consisting of Ca, Na, K, Ba, Al, Ti, Zr, Si, Mn, V, Cr and B, at temperatures above 1,550 degrees Celsius.

5. The method of claim 1 wherein the furnace comprises a fire-resistant lining, with a bottom, walls, a housing with apertures to supply bulk materials, and a dome-shaped removable roof with electrode holders, the furnace designed with an ability to bypass and replace electrodes, while the housing walls are designed with at least three apertures along the perimeter of the walls to supply OCM to the central zone of the furnace, adjacent to an electric arc burning zone and restricted to sizes of no more than $D=(d_p+3.5\ d_{EL})$, where $d_p$ is a diameter of disintegration of electrodes, $d_{EL}$ is a diameter of electrodes, located below a level of an upper mark of the housing at 0.2-1.0 mm.

6. The method of claim 5, wherein the at least three apertures along the perimeter of the walls for supplying OCM to the central zone of the furnace are disposed between two neighboring electrodes.

* * * * *